Figure 1:
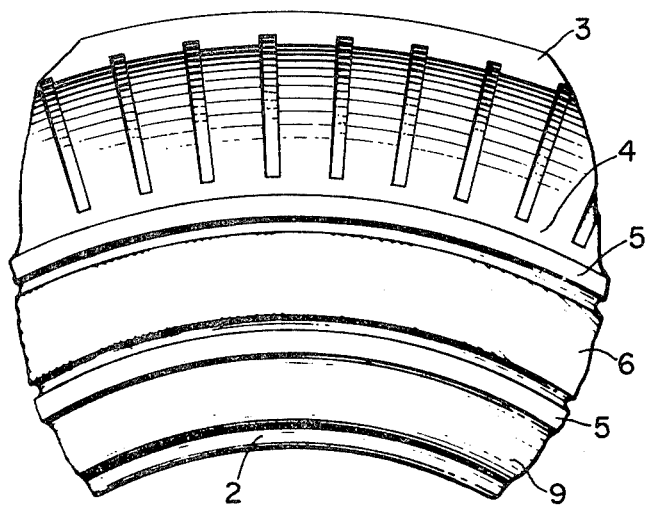

United States Patent [19]

Sandstrom et al.

[11] 4,003,420
[45] Jan. 18, 1977

[54] TIRE WITH SIDEWALL COMPOSITION

[75] Inventors: Paul H. Sandstrom, Tallmadge; Joginder Lal, Akron, both of Ohio

[73] Assignee: The Goodyear Tire & Rubber Company, Akron, Ohio

[22] Filed: Dec. 19, 1975

[21] Appl. No.: 642,274

[52] U.S. Cl. .......................... 152/355; 152/353 R; 152/DIG. 12; 156/110 C; 156/116; 260/4 R; 260/5; 260/875; 260/878; 260/879; 260/888; 260/889; 260/894

[51] Int. Cl.² .................. C08F 15/06; C08G 20/20

[58] Field of Search ........... 260/5, 889, 80.78, 4 R, 260/879, 878, 875, 888, 889, 894; 152/355

[56] References Cited

UNITED STATES PATENTS

| 3,638,702 | 2/1972 | Endter | 152/330 |
|---|---|---|---|
| 3,704,741 | 12/1972 | Turk | 260/5 X |
| 3,766,302 | 10/1973 | Holub et al. | 260/884 |
| 3,821,134 | 6/1974 | Son et al. | 260/5 |
| 3,830,274 | 8/1974 | Waser, Jr. | 260/5 X |
| 3,859,263 | 1/1975 | O'Connor | 260/80.78 |
| 3,897,405 | 7/1975 | Son et al. | 260/5 X |

*Primary Examiner*—Murray Tillman
*Assistant Examiner*—T. DeBenedictis, Sr.
*Attorney, Agent, or Firm*—F. W. Brunner; H. C. Young, Jr.

[57] ABSTRACT

The invention relates to pneumatic tire sidewalls and to compositions useful therefor. Such sidewall composition particularly comprise a manipulated blend of (A) ethylene/propylene/diene terpolymer, (B) a rubbery α-olefin interpolymer and (C) a high unsaturation rubber comprised of about 30 to about 80 weight percent natural rubber. The sidewall composition particularly enhances the adhesion of the sidewall to the tire carcass stock.

13 Claims, 3 Drawing Figures

U.S. Patent  Jan. 18, 1977  4,003,420

TIRE WITH SIDEWALL COMPOSITION

This invention relates to pneumatic tire sidewalls and to compositions useful therefor. The invention particularly relates to tire sidewalls and to corresponding elastomer blends. Such elastomeric blends, or compositions, are useful for sidewalls of tires, including white sidewalls, black sidewalls and coverstrips for white sidewalls.

Pneumatic rubber tires are typically prepared with a protective outer sidewall portion, which can consist entirely of a black sidewall or of a white sidewall under a black coverstrip portion which is at least partially buffed away to expose a desired width of the white sidewall. Such sidewalls are subjected to extensive flexing and continual distortion under normal running conditions of the tire under load. Such conditions include temperatures significantly higher than the ambient temperature. Degradation of the sidewall under these conditions is made visible quickly and dramatically by environmental chemical action, flex-cracking and loss of adhesion to the tire carcass. The atmospheric chemical action, such as ozone attack and flex-cracking erode and degrade the sidewall. Adhesion deficiency of the layers of rubber at the elevated operating temperatures can typically result in a separation of the sidewall from the carcass. All these degradative factors promote tire failure hazards.

Therefore, it is an object of this invention to provide a pneumatic tire with a sidewall of a novel rubber composition having improved adhesion to the carcass under degradative operating conditions.

It is well known that EPDM rubbers, terpolymers of ethylene, propylene and a nonconjugated diene, offer many superior qualities, particularly excellent resistance to ozone and aging. It is also well known in the art that elastomeric blends of EPDM rubber and high unsaturation rubbers prepared from conventional, conjugated dienes are used in tire sidewalls because of the ozone resistance imparted by the EPDM. However, the addition of the EPDM to such high unsaturation rubbers in the sidewall composition has been known to cause a substantial loss of adhesion to tire carcass stock.

INVENTION

It has now been discovered that sidewalls of a pneumatic tire which are subjected to extensive flexing can be prepared from a suitable cured elastomer blend of a combination of elastomeric materials. The sidewalls so obtained have been found to provide good adhesion to tire carcass.

In accordance with this invention, a pneumatic rubber tire is provided comprising a generally toroidal shaped carcass with a circumferential tread, shaped beads and connecting sidewall portions extending between said tread and beads and having adhered to said sidewall portion an outer rubbery sidewall layer extending from the general area of said bead portion towards said tread, where said rubbery sidewall layer is comprised of an elastomeric composition comprised essentially of (A) 20-40 phr, preferably 25-35 phr, EPDM, (B) 2-20 phr, preferably 5-15 phr of a rubbery polymer prepared from at least one $C_4$ - $C_{10}$ $\alpha$-olefin interpolymerized with at least one $C_5$ - $C_{30}$ nonconjugated polyene, and (C) 55-78 phr, preferably 65-75 phr, of high unsaturation rubbers comprised of about 30 to about 80 weight percent natural rubber. The term "polyene" as used in this specification denotes a molecule containing two or more carbon to carbon double bonds.

If the sidewall layer is white or has a color, a coverstrip layer is generally at least partially superimposed on it. After curing, the overlapping coverstrip is customarily buffed to expose a desired width of the white or colored sidewall composition.

The high unsaturation rubbers are those selected from the group consisting of natural high cis-1,4-polyisoprene rubber, synthetic high cis-1,4-polyisoprene, high cis-1,4-polybutadiene, butadiene/styrene rubber or SBR, solution SBR and polyalkenylenes. Natural rubber and SBR are preferred. The total amount of rubbers in the formulation is based on 100 parts by weight. The peel adhesion of the blend composition of this invention to tire carcass stock was found to be unexpectedly higher than that obtained from similar blends containing EPDM and the high unsaturation rubbers. These blend compositions without any added antiozonant in the curing recipe also exhibit excellent ozone resistance under static or dynamic test conditions.

It should be understood by one skilled in the art that said outer sidewall and coverstrip layers can be compounded by methods generally known in rubber compounding, such as by mixing the constituent rubbers in the recipe with various curatives, processing additives, fillers, pigments, antioxidants and antiozonants. However, in order to maintain compatibility with the basic pneumatic rubber tire carcass, it is required that the said cured sidewall and coverstrip layers be characterized by having a 300 percent modulus at 25° C. in the range of about 500-1200 pounds per square inch, preferably 600-800 pounds per square inch.

Figure 2:
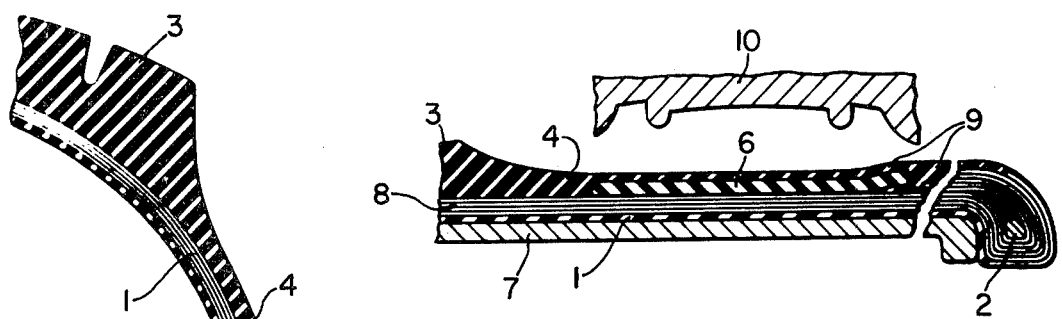
Figure 3:
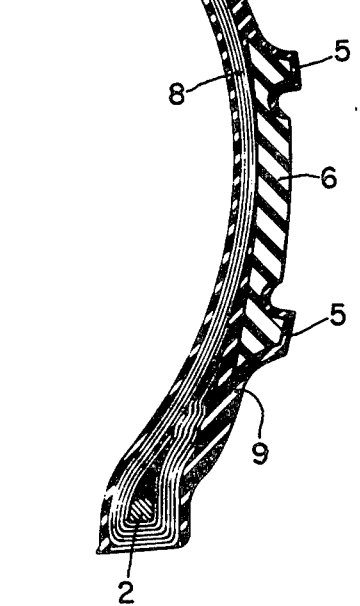

Further objects and advantages of this invention with regard to pneumatic rubber tires will be apparent when the specification is read in conjunction with the accompanying drawings in which FIG. 1 is a side elevational view of a pneumatic rubber tire employing this invention, FIG. 2 is a cross-sectional view, with parts broken away, of a green tire layup and a portion of the mold for the tire and FIG. 3 is a partial cross-sectional view of the molded and cured rubber tire.

Referring to the drawings, the cured rubber tire comprises the usual carcass 1, bead portions 2, tread portion 3 and connecting sidewall portion 4. One or more scuff ribs 5 may extend circumferentially around the side of the tire to protect an outer colored sidewall layer 6.

More specifically, the tire is typically formed on a building drum 7 with the usual carcass plies 8, bead 2 and tread 3. At least one of the sidewalls 4 includes an outer adherent colored sidewall layer 6 between the ribs 5 other than black, and an adherent coverstrip 9 extending from the bead portion 2 over at least a portion of the said colored sidewall overlay 6. If desired, the coverstrip overlay can be extended to the tread portion 3.

The green tire is then placed in a mold 10 where it is heated and cured to form the cured tire more clearly shown as a cross-sectional view by FIG. 3.

The cured sidewall coverstrip is buffed to remove a portion thereof and expose the colored sidewall overlay 6 as demonstrated in the cross-sectional view of FIG. 3.

Thus, the complete vehicular tire, which typically may be of the bias, bias-belted or radial construction, exhibits a black sidewall or coverstrip layer having improved hot peel adhesion to the tire carcass.

RUBBERY POLYMERS

The rubbery $C_4$-$C_{10}$ α-olefin polymers employed in the practice of the invention are prepared by interpolymerizing 70–98 weight percent of at least one $C_4$-$C_{10}$ α-olefin with 30–2 weight percent of at least one $C_5$-$C_{30}$ nonconjugated polyene containing from 2 to 8, preferably from 2 to 4, carbon to carbon double bonds using a coordination or Ziegler-type catalyst. The inherent viscosities of these rubbery α-olefin polymers can be in the range of about 1 to 10 dl/g, preferably between 2 to 7 dl/g. Representative of such α-olefins are, for example, 1-butene, 1-pentene, 1-hexene, 1-octene, and 1-decene, of which 1-hexene or mixtures of 1-butene and 1-hexene are preferred. The α-olefins need not be linear. They may be branched. Representative of such nonconjugated dienes are 1,4-pentadiene, 1,4-hexadiene, 1,5-hexadiene, 2-methyl-1,5-hexadiene, 4-methyl-1,4-hexadiene, 5-methyl-1,4-hexadiene, 3,3-dimethyl-1,5-hexadiene, 1,7-octadiene, 1,9-decadiene, 1,19-eicosadiene, 5-vinylnorbornene, 5-ethylidene norbornene, 5-(3-butenyl)-norbornene and the like. 5-Methyl-1,4-hexadiene is preferred. It may be used in conjunction with 4-methyl-1,4-hexadiene which is usually produced along with the 5-methyl isomer in the methods for synthesizing the 5-methyl isomer. Examples of nonconjugated polyenes are 1,5,9-tetradecatriene and 1,5,9,13,17-nonadecapentaene. The preparation of polyene mixtures has been described in U.S. Pat. No. 3,859,263 Jan. 7, 1975).

In the description of this invention, EPDM means an ethylene-propylene-diene rubber containing from about 20 to 75 weight percent ethylene, from about 80 to 25 weight percent propylene, and a minor proportion of from about 1 to 15 weight percent of $C_5$-$C_{30}$ nonconjugated diene. Typical examples of EPDM are rubbery terpolymers of ethylene, propylene and a suitable diene such as 1,4-hexadiene, dicyclopentadiene, ethylidene norbornene, or methylene norbornene.

In the description of this invention SBR means an emulsion copolymer of styrene and butadiene containing less than 50, and typically about 2 to about 30 percent by weight of styrene. Solution SBR means random copolymers of styrene and butadiene prepared with lithium or alkyllithium catalysts and containing less than 50, and typically about 2 to about 30 percent by weight of styrene.

High cis-1,4-polyisoprene means a homopolymer of isoprene containing more than 70 percent cis-1,4, structure. High cis-1,4-polybutadiene means a homopolymer of butadiene containing more than 70 percent cis-1,4 structure.

Polyalkenylenes mean homopolymers of cyclomonoolefins, homopolymers of nonconjugated cyclopolyolefins, and interpolymers of cyclomonoolefins with nonconjugated cyclopolyolefins. Examples are: polypentenylene which is a homopolymer of cyclopentene having about 5–99 percent cis and 95–1 percent trans configurations of double bonds; polyoctenylene which is a homopolymer of cyclooctene having about 25–95 percent cis and 75–5 percent trans configurations of double bonds; polyoctadienylene which is a homopolymer of 1,5-cyclooctadiene having about 25–85 percent cis and 75–15 percent trans configurations of double bonds; copolymers of cyclopentene and dicyclopentadiene containing 10–40 mole percent dicyclopentadiene; and copolymers of cyclooctene and 1,5-cyclooctadiene containing 10–50 mole percent of the cyclooctadiene.

The term phr means parts per hundred of total rubber, by weight.

Typical examples of high unsaturation diene rubbers are natural rubber, high cis-1,4-polyisoprene, high cis-1,4-polybutadiene, 1,3-butadiene-styrene copolymers (SBR) and polyalkenylenes.

All the elastomers required in the practice of our invention are readily prepared by means of catalysts known to the art.

Inherent viscosity values for the polymers are obtained at 30° C. on 0.05–0.1 percent (w/v) solution in toluene and are expressed in units of deciliters per gram (dl/g).

The practice of this invention is further illustrated by reference to the following examples which are intended to be representative rather than restrictive of the scope of the invention. Unless otherwise indicated, all parts and percentages are by weight.

EXAMPLE 1

A. Test sample preparation.

Samples of several rubber blend compositions for use in the sidewalls were prepared and examined for their peel adhesion to a representative pneumatic rubber tire carcass. Such rubber blend compositions were prepared by mixing the rubbers in a Banbury with carbon black and other ingredients as specified in Table I. Sulfur and accelerators were then milled into the black stocks. The resulting compositions were sheeted out and a 6 inches ×6 inches sample (60 grams) cut out for use in the fabrication of a peel test block 6 inches ×6 inches ×.25 inches.

The peel test block consisted of a layer of the above described blend composition stock resting against a layer of carcass stock and separated at one end by a 1½ inches wide strip of heavy aluminum foil. These two stocks were sandwiched between outer layers of nylon cord backing. The test block was cured for 18 minutes at 300° F. Test samples, 1 inch wide, were cut out from the peel test block. The ends of the test sample separated by the aluminum foil, were placed in the jaws of an Instron machine for the peel test. After conditioning for 10 minutes at 200° F., the ends were pulled (2 inches/min.) at a 90° angle to the test piece and adhesion values recorded. Two samples of each composition were tested. A typical carcass rubber composition used for adhesion testing is shown in Table II.

B. Results.

The data in Table III show the effect on adhesion by a partial or total replacement of EPDM (Royalene 301T, a trademark of Uniroyal) with a copolymer of 1-hexene and methylhexadiene (inherent viscosity 3.9). The rubber blend compositions also contained natural rubber (no. 1 smoked sheet) and SBR 1502 (a copolymer of 23.5 percent styrene and 76.5 percent butadiene). A partial replacement of EPDM with 5 phr of the hexene copolymer or pentene copolymer provided a 50 percent increase in peel adhesion to the tire carcass stock. At the 10 phr replacement level with the hexene copolymer an increase of 25 percent in peel adhesion resulted, whereas at a 15 phr replacement level the adhesion was essentially equivalent to the control containing 30 phr of EPDM. At the 20 phr level of hexene copolymer, or by total replacement of the EPDM with the hexene copolymer or pentene copolymer, the adhesion dropped severely. These results demonstrate that EPDM in these blend compositions can be partially substituted with the polymers of our invention and lead to significant increase in hot peel adhesion to carcass stock. These data are novel and are not predictable from the prior art.

TABLE 1

Compound Recipe

| | |
|---|---|
| Rubbers | 100[a] |
| FEF Carbon Black | 25 |
| Stearic Acid | 2 |
| Zinc oxide | 3 |
| Antiozonant | 0.75 |
| Antioxidant | 0.75 |
| Sulfur | 1.5 |
| Accelerators | 0.9 |

Rubbers through Antioxidant: Banbury
Sulfur and Accelerators: Mill

[a]Parts by Weight

TABLE II

| Compound | Parts |
|---|---|
| Natural Rubber (Brown Crepe No. 2) | 100 |
| Process Oil | 5 |
| Tackifying Resins | 7.5 |
| Stearic Acid | 2 |
| Antioxidant (phenolic) | 1 |
| Carbon Black | 30 |
| Sulfur | 2.75 |
| Zinc Oxide | 3 |
| Accelerator | 1.55 |

Table III

PEEL ADHESION OF RUBBER BLEND TIRE SIDEWALL COMPOSITIONS TO A CARCASS STOCK

| Rubber Blend Composition | | | | | Adhesion, lbs/inch |
|---|---|---|---|---|---|
| Natural Rubber | SBR[a] 1502 | EPDM[b] | Hexene Copolymer[c,d] | Pentene Copolymer[c,e] | |
| 35 | 35 | 30 | 0 | 0 | 20 |
| 35 | 35 | 25 | 5 | 0 | 30 |
| 35 | 35 | 20 | 10 | 0 | 25 |
| 35 | 35 | 15 | 15 | 0 | 21 |
| 35 | 35 | 10 | 20 | 0 | 5 |
| 35 | 35 | 0 | 30 | 0 | 6 |
| 35 | 35 | 25 | 0 | 5 | 30 |
| 35 | 35 | 0 | 0 | 30 | 5 |

[a]Styrene/butadiene emulsion copolymer, 23.5% bound styrene
[b]Ethylene/propylene/dicyclopentadiene terpolymer ("Royalene 301T," TM - Uniroyal)
[c]Methylhexadiene is a 60:40 mixture of 4- and 5-methyl-1,4-hexadienes
[d]Molar charge ratio of 1-hexene to methylhexadiene was 90:10
[e]Molar charge ratio of 1-pentene to the methylhexadiene was 90:10

EXAMPLE 2

The data in Table IV show the effect of the ratio of natural rubber to SBR on the adhesion to carcass stock of blends containing 30 phr EPDM ("Royalene 301T") or blends having EPDM partially replaced with a copolymer of hexene and methylhexadiene (inherent viscosity 6.9). These rubber compositions were prepared and tested as described in Example 1. It is apparent that the blends containing 70 phr of natural rubber (Series A) or SBR (Series B) with 30 phr of EPDM exhibit decreased adhesion to a tire carcass stock when the EPDM is partially replaced with 5 or 10 phr of the hexene copolymer. However, blends containing both natural rubber and SBR, in Series C, D, and E showed improved adhesion upon partial replacement of EPDM with 5 or 10 phr of the hexene copolymer.

TABLE IV

PEEL ADHESION OF RUBBER BLEND TIRE SIDEWALL COMPOSITIONS TO A CARCASS STOCK

| Rubber Blend Composition | | | | Adhesion, lbs/inch |
|---|---|---|---|---|
| Natural Rubber | SBR 1502 | EPDM | Hexene[a] Copolymer | |
| Series A | | | | |
| 70 | 0 | 30 | 0 | 9 |
| 70 | 0 | 25 | 5 | 8 |
| 70 | 0 | 20 | 10 | 6 |
| Series B | | | | |
| 0 | 70 | 30 | 0 | 23 |
| 0 | 70 | 25 | 5 | 19 |
| 0 | 70 | 20 | 10 | 12 |
| Series C | | | | |
| 45 | 25 | 30 | 0 | 35 |
| 45 | 25 | 25 | 5 | 37 |
| 45 | 25 | 20 | 10 | 45 |
| Series D | | | | |
| 35 | 35 | 30 | 0 | 23 |
| 35 | 35 | 25 | 5 | 31 |
| 35 | 35 | 20 | 10 | 29 |
| Series E | | | | |
| 25 | 45 | 30 | 0 | 23 |
| 25 | 45 | 25 | 5 | 33 |
| 25 | 45 | 20 | 10 | 32 |

[a]Molar charge ratio of 1-hexene to methylhexadiene was 90:10.

EXAMPLE 3

The data in Table V show the effect on adhesion to carcass stock by a partial or total replacement of two different EPDM rubbers (Nordel 1470, trademark of E. I. duPont de Nemours & Co., and Epsyn 55, trademark of Copolymer Rubber and Chemical Corporation), in the tire sidewall composition with a copolymer of hexene and methylhexadiene having an inherent viscosity of about 5.2. The rubber blend tire sidewall compositions also contained natural rubber, No. 1 smoked sheet, and SBR 1502 (trademark of the Goodyear Tire & Rubber Company), a copolymer of 23.5 percent styrene and 76.5 percent butadiene. A partial replacement of either EPDM with 5 phr of the hexene copolymer provided substantially improved adhesion, whereas total replacement caused a drop of adhesion. These results are not entirely predictable.

TABLE V

PEEL ADHESION OF RUBBER BLEND TIRE SIDEWALL COMPOSITIONS TO A CARCASS STOCK

| Rubber Blend Composition | | | | Adhesion, lbs/inch |
|---|---|---|---|---|
| Natural Rubber | SBR 1502 | EPDM | Hexene[a] Copolymer | |
| 35 | 35 | 30[b] | 0 | 8 |
| 35 | 35 | 25[b] | 5 | 17 |
| 35 | 35 | 30[c] | 0 | 20 |
| 35 | 35 | 25[c] | 5 | 24 |
| 35 | 35 | 0 | 30 | 6 |

[a]Molar charge ratio of 1-hexene to methylhexadiene was 90:10; methylhexadiene is a 60:40 mixture of 4- and 5-methyl-1,4-hexadiene.
[b]Ethylene/propylene/1,4-hexadiene terpolymer, Nordel 1470
[c]ethylene/propylene/ethylidene norbornene terpolymer, Epsyn 55

EXAMPLE 4

The data in Table VI show the effect on peel adhesion to tire carcass by partial or total replacement of EPDM with a copolymer of hexene and methylhexadiene having an inherent viscosity of about 4.0 in tire sidewall blends containing 20, 30 and 40 phr EPDM. The blend compositions also contained natural rubber of No. 1 smoked sheet and SBR 1502 in total amounts of 80, 70, and 60 phr. In Series A, the data show that the partial replacement of EPDM with the hexene copolymer had no effect on adhesion, whereas in Series B and C partial replacement produced improved adhesion values. The total replacement of EPDM caused a substantial drop in adhesion.

TABLE VI

PEEL ADHESION OF RUBBER BLEND TIRE SIDEWALL COMPOSITIONS TO A CARCASS STOCK

| Rubber Blend Composition | | | | |
|---|---|---|---|---|
| Natural Rubber | SBR 1502 | EPDM[a] | Copolymer[b] | Adhesion, lbs/inch |
| Series A | | | | |
| 40 | 40 | 20 | 0 | 26 |
| 40 | 40 | 15 | 5 | 26 |
| 40 | 40 | 0 | 20 | 18 |
| Series B | | | | |
| 35 | 35 | 30 | 0 | 19 |
| 35 | 35 | 25 | 5 | 24 |
| 35 | 35 | 0 | 30 | 3 |
| Series C | | | | |
| 30 | 30 | 40 | 0 | 4 |
| 30 | 30 | 35 | 5 | 7 |
| 30 | 30 | 0 | 40 | 2 |

[a] Ethylene/propylene/dicyclopentadiene terpolymer, Royalene 301T.
[b] Molar charge ratio of 1-hexene to methylhexadiene was 90:10; methylhexadiene is a 60:40 mixture of 4- and 5-methyl-1,4-hexadiene.

EXAMPLE 5

The data in Series A of Table VII show the effect of partial replacement of EPDM with a hexene copolymer having an inherent viscosity of about 6.9 in tire sidewall blend compositions on adhesion to carcass. These blend compositions also contained natural rubber and cis-1,4-polybutadiene. At a 16.6 percent level of the EPDM replacement by the hexene copolymer, a higher value of adhesion was obtained, whereas at the 50 percent replacement level, the adhesion was considerably lower. In Series B, the partial replacement of EPDM at the 16.6 or 50 percent level in blends also containing natural rubber and polypentenamer produced higher adhesion values.

TABLE VII

PEEL ADHESION OF RUBBER BLEND TIRE SIDEWALL COMPOSITIONS TO A CARCASS STOCK

| Rubber Blend Composition | | | | |
|---|---|---|---|---|
| Series A | | | | |
| Natural Rubber | Cis-1,4-Polybutadiene[a] | EPDM[b] | Hexene Copolymer[c] | Adhesion, lbs/inch |
| 35 | 35 | 30 | 0 | 31 |
| 35 | 35 | 25 | 5 | 35 |
| 35 | 35 | 15 | 15 | 15 |
| Series B | | | | |
| Natural Rubber | Polypentenylene[d] | EPDM[b] | Hexene Copolymer[c] | Adhesion, lbs/inch |
| 35 | 35 | 30 | 0 | 13 |
| 35 | 35 | 25 | 5 | 21 |
| 35 | 35 | 15 | 15 | 17 |

[a] Minimum 95 percent cis-1,4-structure, inherent viscosity 3.0.
[b] Ethylene/propylene/dicyclopentadiene terpolymer, Royalene 301T.
[c] Molar charge ratio of 1-hexene to methylhexadiene was 90:10; methylhexadiene is a 60:40 mixture of 4- and 5-methyl-1,4-hexadiene.
[d] Polypentenylene is a homopolymer of cyclopentene prepared with a W/Al catalyst; inherent viscosity 2.4; 87 percent trans structure of the double bond.

EXAMPLE 6

The data in Table VIII show the effect on peel adhesion of a tire sidewall composition to a carcass stock by a partial or total replacement of EPDM in the sidewall composition with four different hexene copolymers which had been prepared with 3, 10, 20 and 30 mole percent charges of methylhexadiene. The inherent viscosities of these copolymers were 9.6, 6.9, 4.6 and 3.3, respectively. The partial replacement of EPDM with each of the hexene copolymers produced higher adhesion, whereas total replacement caused a sharp drop in adhesion.

TABLE VIII

PEEL ADHESION OF RUBBER BLEND TIRE SIDEWALL COMPOSITIONS TO A CARCASS STOCK

| Rubber Blend Composition | | | | |
|---|---|---|---|---|
| Natural Rubber | SBR 1502 | EPDM[a] | Hexene Copolymer | Adhesion, lbs/inch |
| 35 | 35 | 30 | 0 | 19 |
| 35 | 35 | 25 | 5 (b,c) | 27 |
| 35 | 35 | 0 | 30 (b,c) | 3 |
| 35 | 35 | 25 | 5 (c,d) | 23 |
| 35 | 35 | 0 | 30 (c,d) | 3 |
| 35 | 35 | 25 | 5 (c,e) | 21 |
| 35 | 35 | 0 | 30 (c,e) | 5 |
| 35 | 35 | 25 | 5 (c,f) | 26 |
| 35 | 35 | 0 | 30 (c,f) | 5 |

[a] Ethylene/propylene/dicyclopentadiene terpolymer, Royalene 301T.
[b] Molar charge ratio of 1-hexene to methylhexadiene was 97:3.
[c] Methylhexadiene is a 60:40 mixture of 4- and 5-methyl-1,4-hexadiene.
[d] Molar charge ratio of 1-hexene to methylhexadiene was 90:10.
[e] Molar charge ratio of 1-hexene to methylhexadiene was 80:20.
[f] Molar charge ratio of 1-hexene to methylhexadiene was 70:30.

EXAMPLE 7

The data in Table IX show the effect on peel adhesion of a tire sidewall composition to a carcass stock by a partial or total replacement of EPDM in the sidewall composition with several different α-olefin polymers. These tire sidewall blend compositions also contained natural rubber (No. 1 smoked sheet), and SBR 1502. The adhesion data indicate that higher adhesion valves by the partial replacement and lower adhesion by the total replacement of EPDM were obtained in the case of all α-olefin polymers.

TABLE IX

PEEL ADHESION OF RUBBER BLEND TIRE SIDEWALL COMPOSITIONS TO A CARCASS STOCK

| Rubber Blend Composition | | | | |
|---|---|---|---|---|
| Natural Rubber | SBR 1502 | EPDM[a] | α-olefin Polymer | Adhesion lbs/inch |
| 35 | 35 | 30 | 0 | 19 |
| 35 | 35 | 25 | 5 (b) | 30 |
| 35 | 35 | 0 | 30 (b) | 3 |
| 35 | 35 | 25 | 5 (c,d) | 29 |
| 35 | 35 | 0 | 30 (c,d) | 4 |
| 35 | 35 | 25 | 5 (d,e) | 33 |
| 35 | 35 | 0 | 30 (d,e) | 4 |
| 35 | 35 | 25 | 5 (d,f) | 24 |
| 35 | 35 | 0 | 30 (d,f) | 3 |

[a] Ethylene/propylene/dicyclopentadiene terpolymer, Royalene 301T.
[b] Molar charge ratio of 1-hexene to 1,7-octadiene was 90:10; inherent viscosity 3.0.
[c] Molar charge ratio of 1-octene to methylhexadiene was 90:10; inherent viscosity 3.6.
[d] Methylhexadiene is a 60:40 mixture of 4- and 5-methyl-1,4-hexadiene.
[e] Molar charge ratio of α-olefin mixture (equal weight ratio of 1-hexene, 1-octene and 1-decene) to methylhexadiene was 97:3; inherent viscosity 4.2.
[f] Molar charge ratio of 1-butene, 1-hexene and methylhexadiene was 70:25:5; inherent viscosity 3.4.

EXAMPLE 8

Stress-strain data for several rubber blend tire sidewall compositions are shown in Table X. The blends contained natural rubber (No. 1 smoked sheet), SBR, and various amounts of EPDM and a hexene copolymer having an inherent viscosity of about 6.9. The tensile strength and 300 percent modulus values of the blend compositions containing 5 and 10 phr of the hexene copolymer were somewhat higher than those obtained for the control blend containing EPDM but no hexene copolymer. However, at the 15 phr level the tensile strength was equivalent, but the modulus was lower. For the case of total replacement of EPDM with the hexene copolymer, still lower tensile strength was obtained. However, the modulus was higher than that of the control.

A Kinetic ozone test was conducted on a cured sample 6 inches × 0.5 inch × 0.08 inch. This sample was flexed from zero to about 25 percent elongation at the rate of 25 cycles per minute. Flexing was carried out at 39° C. for 192 hours in a sealed ozone chamber having ozone concentration of 50 parts per 100 million by volume. All of the test samples of the compositions shown in Table X exhibited no visible signs of ozone cracking. The exception was the composition containing 30 phr of the hexene copolymer which exhibited a few large cracks.

TABLE X
STRESS STRAIN PROPERTIES OF RUBBER BLEND TIRE SIDEWALL COMPOSITIONS

Rubber Blend Composition

| Natural Rubber | SBR 1502 | EPDM[a] | Hexene[b] Copolymer | Tensile strength, psi | 300% mod, psi(d) | Elongation at break % |
|---|---|---|---|---|---|---|
| 35 | 35 | 30 | 0[c] | 1860 | 670 | 595 |
| 35 | 35 | 25 | 5[c] | 2080 | 790 | 545 |
| 35 | 35 | 20 | 10[c] | 2120 | 775 | 590 |
| 35 | 35 | 15 | 15 | 1850 | 595 | 520 |
| 35 | 35 | 0 | 30 | 1510 | 730 | 495 |

[a]Ethylene/propylene/dicyclopentadiene terpolymer, Royalene 301T.
[b]Molar charge ratio of 1-hexene to methylhexadiene was 90:10; methylhexadiene was a 60:40 mixture of 4- and 5-methyl-1,4-hexadiene.
(c)These blend compositions are designated as Series D in Table IV, Example 2.
(d)300% modulus The foregoing examples show the usefulness of the blend compositions of this invention for tire sidewalls. However, these blend compositions may also be used for fabricating other rubbery goods such as, for example, dock fenders, conveyor belts, hose and the like.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire which comprises a generally toroidal shaped carcass with a circumferential tread, shaped beads and connecting sidewall portions extending between said tread and beads and having adhered to said sidewall portion an adherent, covulcanized outer rubbery sidewall layer extending from the general area of said bead portion towards said tread, where said rubbery sidewall layer is an elastomeric composition comprised of (A) 20-40 phr rubbery EPDM, (B) 2-20 phr of a rubbery polymer prepared from at least one $C_4$-$C_{10}$ α-olefin interpolymerized with at least one $C_5$-$C_{30}$ nonconjugated polyene containing 2 or more carbon to carbon bonds, and (C) 55-78 phr of high unsaturation rubbers comprised of 30 to 80 weight percent natural rubber.

2. The pneumatic tire of claim 1 wherein, in said rubbery sidewall layer, said EPDM is an ethylene-propylenediene rubber containing about 20 to 75 weight percent ethylene, about 80 to 25 weight percent propylene, and a minor proportion of about 1 to 15 weight percent of a nonconjugated diene selected from at least one of 1,4-hexadiene, dicyclopentadiene, ethylidene norbornene, and methylene norbornene, where said rubbery α-olefin interpolymer is the interpolymerization product of a monomer mixture comprised of about 70 to about 98 weight percent of at least one $C_4$-$C_{10}$ α-olefin with 30-2 weight percent of at least one $C_5$-$C_{30}$ nonconjugated polyene containing 2-8 carbon to carbon double bonds in the presence of a coordination or Ziegler-type catalyst, and where said high unsaturation rubber is natural high cis-1,4-polyisoprene rubber and at least one synthetic rubber selected from high cis-1,4-polyisoprene, high cis-1,4-polybutadiene, emulsion-derived butadiene/styrene rubber, solution-derived butadiene/styrene rubber and polyalkenylenes, where said polyalkenylenes are selected from polypentenylene which is a homopolymer or cyclopentene having about 5–99 percent cis and 95–1 percent trans configurations of double bonds, polyoctenylene which is a homopolymer of cyclooctene having about 25–95 percent cis and 75–5 percent trans configurations of double bonds, polyoctadienylene which is a homopolymer of 1,5-cyclooctadiene having about 25–85 percent cis and 75–15 percent trans configurations of double bonds, copolymers of cyclopentene and dicyclopentadiene containing 10–40 mole percent dicyclopentadiene, and copolymers of cyclooctene and 1,5-cyclooctadiene containing 10–50 mole percent of the cyclooctadiene.

3. The pneumatic tire of claim 2 wherein, in said outer sidewall layer, said rubbery α-olefin interpolymer has an inherent viscosity of about 1 to about 10 dl/g as determined in toluene at 30° C. and is prepared by the interpolymerization of at least one α-olefin selected from 1-butene, 1-pentene, 1-hexene, 1-octene, and 1-decene and at least one nonconjugated diene selected from 1,4-hexadiene, 1,5-hexadiene, 2-methyl-1,5-hexadiene, 4-methyl-1,4-hexadiene, 5-methyl-1,4-hexadiene, 3,3-dimethyl-1,5-hexadiene, 1,7-octadiene, 1,9-decadiene and 1,19-eicosadiene.

4. The pneumatic tire of claim 3 where said α-olefin interpolymer is prepared by the interpolymerization of 1-butene, 1-hexene and a mixture of 4-methyl-1,4-hexadiene and 5-methyl-1,4-hexadiene.

5. The pneumatic tire of claim 3 where, in said outer sidewall layer, said high unsaturation rubber is comprised of natural high cis-1,4-polyisoprene rubber and butadiene/styrene rubber.

6. The pneumatic tire of claim 3 where, in said outer rubbery sidewall layer, said high unsaturation rubber is comprised of natural high cis-1,4-polyisoprene rubber and at least one synthetic rubber selected from butadiene/styrene rubber and a polyalkenylene rubber selected from polypentenylene and copolymers of cyclopentene and dicyclopentadiene.

7. The elastomeric composition suitable for said rubbery sidewall layer of claim 1 comprised of (A) 20–40 phr rubbery EPDM, (B) 2–20 phr of a rubbery polymer prepared from at least one $C_4$-$C_{10}$ α-olefin interpolymerized with at least one $C_5$-$C_{30}$ nonconjugated polyene containing 2 or more carbon-to-carbon double bonds, and (C) 55–78 phr of high unsaturation rubbers comprised of 30 to 80 weight percent natural rubber.

8. The elastomeric composition of claim 7 where said EPDM is an ethylene-propylene-diene rubber containing from about 20 to 75 weight percent ethylene, from about 80 to 25 weight percent propylene, and a minor proportion of from 1 to about 15 weight percent of a nonconjugated diene selected from at least one of 1,4-hexadiene, dicyclopentadiene, ethylidene norbornene, and methylene norbornene, where said rubbery α-olefin interpolymer is the interpolymerization product of a monomer mixture comprised of about 70 to about 98 weight percent of at least one $C_4$-$C_{10}$ α-olefin and correspondingly about 30 to about 2 weight percent of at least one $C_5$-$C_{30}$ nonconjugated polyene containing from 2 to 8 carbon to carbon double bonds in the presence of a coordination or Ziegler-type catalyst, and where said high unsaturation rubber is natural high cis-1,4-polyisoprene rubber and at least one synthetic rubber selected from high cis-1,4-polyisoprene, high cis-1,4-polybutadiene, emulsion-derived butadiene/styrene rubber, solution-derived butadiene/styrene rubber and polyalkenylenes, where said polyalkenylenes are selected from polypentenylene which is a homopolymer of cyclopentene having about 5–99 percent cis and 95–1 percent trans configurations of double bonds, polyoctenylene which is a homopolymer of cyclooctene having about 25–95 percent cis and 75–5 percent trans configurations of double bonds, polyoctadienylene which is a homopolymer of 1,5-cyclooctadiene having about 25–85 percent cis and 75–15 percent trans configurations of double bonds, copolymers of cyclopentene and dicyclopentadiene containing 10–40 mole percent dicyclopentadiene, and copolymers of cyclooctene and 1,5-cyclooctadiene containing 10–50 mole percent of the cyclooctadiene.

9. The elastomeric composition of claim 8 where said rubber α-olefin interpolymer has an inherent viscosity of about 1 to about 10 dl/g as determined in toluene at 30° C. and is prepared by the interpolymerization of at least one α-olefin selected from 1-butene, 1-pentene, 1-hexene, 1-octene, and 1-decene and at least one nonconjugated diene selected from 1,4-hexadiene, 1,5-hexadiene, 2-methyl-1,5-hexadiene, 4-methyl-1,4-hexadiene, 5-methyl-1,4-hexadiene, 3,3-dimethyl-1,5-hexadiene, 1,7-octadiene, 1,9-decadiene and 1,19-eicosadiene.

10. The elastomeric composition of claim 9 where said α-olefin interpolymer is prepared by the interpolymerization of 1-butene, 1-hexene and a mixture of 4-methyl-1,4-hexadiene and 5-methyl-1,4-hexadiene.

11. The elastomeric composition of claim 9 where, in said outer sidewall layer, said high unsaturation rubber is comprised of natural high cis-1,4-polyisoprene rubber and butadiene/styrene rubber.

12. The elastomeric composition of claim 9 where said high unsaturation rubber is comprised of natural high cis-1,4-polyisoprene rubber and at least one synthetic rubber selected from butadiene/styrene rubber and a polyalkenylene rubber selected from polypentenylene and copolymers of cyclopentene and dicyclopentadiene.

13. The elastomeric composition of claim 1 comprised of (A) 20–40 phr rubbery EPDM, (B) 2–20 phr of a rubbery polymer prepared from at least one $C_4$-$C_{10}$ α-olefin interpolymerized with at least one $C_5$-$C_{30}$ nonconjugated polyene containing 2 or more carbon-to-carbon double bonds, and (C) 55–78 phr of high unsaturation rubbers comprised of 30 to 80 weight percent natural rubber.

* * * * *